May 22, 1951     C. M. RIFENBERGH     2,553,833
STRESS MEASURING APPARATUS

Filed July 11, 1947     5 Sheets-Sheet 1

Inventor
CLARE MORGAN RIFENBERGH
by
Attys.

May 22, 1951     C. M. RIFENBERGH     2,553,833
STRESS MEASURING APPARATUS Filed July 11, 1947     5 Sheets-Sheet 5

TORQUE METER READING VS STRESS
FOR .035 WALL MONEL TUBE
FREQUENCY 10 KC

Inventor
CLARE MORGAN RIFENBERGH

Patented May 22, 1951

2,553,833

UNITED STATES PATENT OFFICE 2,553,833

STRESS MEASURING APPARATUS

Clare Morgan Rifenbergh, Chesterton, Ind., assignor, by mesne assignments, to C. Morgan Rifenbergh, Plymouth, Mich.

Application July 11, 1947, Serial No. 760,299

20 Claims. (Cl. 73—136)

This invention relates to apparatus for ascertaining, determining or measuring the stress or strain conditions existent in a member having such properties that the effect of the member upon a magnetic field, or the effect thereon of such magnetic field, is dependent upon the degree to which such member is stressed or strained. In certain of its aspects, the present invention is directed to improvements upon the invention disclosed and claimed in applicant's co-pending application Serial No. 515,277, filed December 22, 1943.

As clearly set forth in the above-identified co-pending application, the stress or strain conditions existing in certain types of members may be conveniently and accurately indicated or measured by the provision of one or more magnetic flux producing elements, such as a coil or winding which are oriented with respect to the member being tested in such fashion that at least a portion of the flux produced thereby is preferentially oriented with respect to the tensile or compressive directional components of the stress applied to the member under test.

When the member being tested includes material which demonstrates either magnetostrictive or elasto-resistive properties, as defined in applicant's co-pending application, then the oriented components of the flux applied to the member under test will be varied as a function of the stress or strain to which the member is subjected i. e., the stress or strain existent therein. While normally stress and strain exist concurrently in a test piece, it is well known to those skilled in this art that under certain conditions, a member may be subjected to strain without application of stress, or conversely to a stress without producing a resultant strain, I shall hereinafter employ the word stress generically to include also the magnetic and electric effects accompanying the production of a strain in a member to be tested, for it is not yet entirely clear whether it is merely the application of stress to the magnetostrictive or elasto-resistive member or the production of a strain therein which is the fundamental cause of the magnetic and electric effects thereby produced.

In carrying forward the development of the stress measuring methods and apparatus of my co-pending application, I have discovered that the coils or winding elements which are utilized to produce fluxes respectively directionally oriented with respect to the compressive or tensile directional components of stress in the members to be tested may be partially or completely superposed without adversely effecting the differential impedance effects produced by the differential effects of the stress oriented fluxes upon the respective coils. Furthermore, no special provisions need be made for locating the two inactive sides of each of the oriented flux-responsive coils so that such sides produce little or no flux linking the members to be tested. Such superposed coil arrangement not only provides a simpler and more compact testing apparatus but also may be utilized over an extremely wide range of frequencies including both audio frequencies and relatively high frequencies of many hundred thousands of cycles. Hence one object of this invention is the provision of a simple, compact, yet reliable and accurate stress measuring apparatus embodying superposed coils or winding elements for producing stress oriented fluxes in the member to be tested.

I have further discovered that stress measuring or indicating may be conveniently accomplished by utilization of alternating, periodic or intermittent currents having an effective frequency lying in the audio range. The employment of current having a frequency in the audio frequency range obviously permits the use of magnetic structures for substantially increasing the flux generating effects of such current. A further feature of this invention is the provision of apparatus for effecting stress measurements by utilization of magnetic flux or fluxes preferentially oriented with respect to the tensile or compressive directional components of the stress in the member being tested, wherein the orientation of the flux is accomplished by the preferential orientation of depressions in a non-uniform pole face of a magnetic structure with respect to the member to be tested so as to define an air gap between the pole face and the member being tested which is directionally oriented with respect to the tensile or compressive directional components of the stress. The apparatus of this invention therefor permit stress-oriented flux or fluxes to be produced in a member under test without the necessity of orienting the coils or windings themselves which generate such flux or fluxes with respect to the stress in the member under test. In the specific example of an apparatus for measuring or indicating torque in a shaft-like member, this invention permits a magnetic flux to be oriented with respect to the tensile or compressive directional components of the torsional stress in the shaft by the utilization of an annular segmental magnetic structure having a pole face disposed adjacent the shaft and wherein the pole face is provided with one or more helically extending depressions or slots which are preferentially oriented with respect to the tensile or compressive directional stress components of the torque applied to the shaft. Hence a coil or winding associated with the magnetic structure may readily produce a stress oriented flux in the shaft without such coil or winding being necessarily oriented with respect to the compressive or tensile directional stress components of the torque in the shaft.

Accordingly, it is a further object of this invention to provide an improved, yet greatly simplified apparatus for measuring or indicating stress in a member to be tested, characterized by the production of stress oriented fluxes in such member by preferential orientation of a non-uniform pole face of a magnetic structure with respect to the member to be tested, and by the elimination of the necessity for orienting the coils or windings producing such fluxes with respect to the tensile or compressive directional components of the stress applied to the member.

A further object is to provide a superposed coil construction for stress measuring apparatus wherein extraneous effects due to temperature gradients and irregularities in the member under test are substantially eliminated.

Another object of this invention is to provide an improved torque meter construction characterized by simplicity of construction, economy of manufacture, compactness, and ease of application to shafts or shaft-like elements.

A further object of this invention is the provision of an economically manufacturable magnetic structure for the pickup of a stress measuring apparatus characterized by the employment of a stack of identical laminations and the skewing of such laminations in the stack to provide a non-uniform pole face contour wherein the grooved or depressed portions of the pole face are preferentially oriented with respect to the tensile or directional components of stress in the member to be tested.

The specific nature of the invention as well as other objects and advantages thereof will become apparent to those skilled in the art from the following detailed description of the annexed sheets of drawings, which, by way of preferred examples only, illustrate several specific embodiments of the invention.

Figure 1:
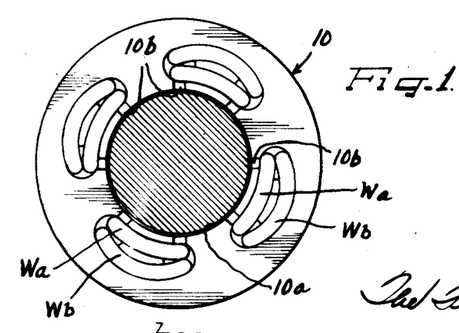
Figure 1 is a side elevational view of a wound magnetic pickup unit for a torquemeter utilizing axially superposed coils in accordance with this invention.
Figure 2:
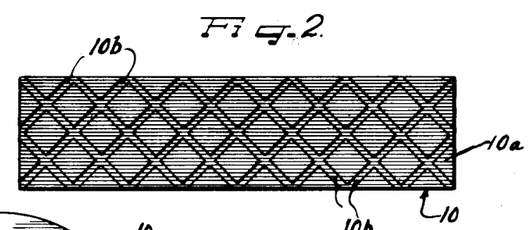
Figure 2 is a developed view of the pole face configuration of the magnetic structure of Figure 1.
Figure 3:
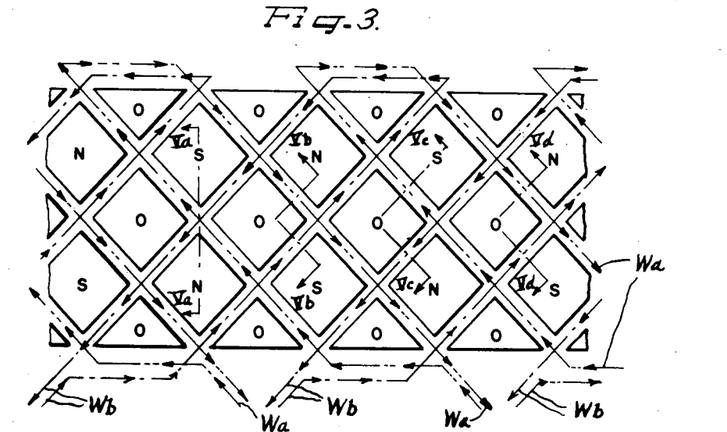
Figure 3 is a schematic view illustrating a stress measuring apparatus embodying a superposed coil arrangement in accordance with this invention.

Referring to Figures 1 and 2, there is shown an unusually simple and compact stress-measuring apparatus which is particularly adapted to the measuring or indicating of the torque conditions in a shaft-like member. Such apparatus comprises a stack 10 of annular magnetic laminations. One face 10a of the stack of laminations is disposed closely adjacent to the periphery of the member to be tested, here shown as the shaft T. As best shown in Figure 2, the pole face portion 10a of the stack is suitably contoured to provide a plurality of grooves, depressions or slots 10b which extend generally helically with respect to the shaft T. Preferably, two sets of such slots are provided, the slots of one set being substantially perpendicular to the slots of the second set. Likewise, the sets of slots are preferentially oriented with respect to the shaft T so that one set of slots is substantially parallel to the tensile directional components of torque applied to the shaft T while the other set of slots is substantially parallel to the compressive directional components of torque. A pair of windings or coils $W_a$ and $W_b$ are provided to cooperate with the stack of laminations 10. Such coils may be conveniently wound in the two sets of slots in the manner to provide a superposed configuration with respect to the surfaces of shaft T similar to that shown schematically in developed relation in Figure 3. Thus the winding $W_a$ has successive coils thereof all disposed substantially perpendicular to and superposed over the winding $W_b$. Note that Figure 3 represents the preferred arrangement of the winding for any type of test piece T including but not limited to shaft-like members. In fact the following analysis of the stress responsive effects of a superposed coil arrangement applies to any shape and form of test piece.

Referring more particularly now to Figure 3, let it be assumed that substantially equal currents are simultaneously applied to the windings $W_a$ and $W_b$ in the assumed direction of flow indicated by the arrows. Such windings may or may not be mounted in a magnetic structure. Such current flow will of course produce a magnetic field about each of the conductors of the two windings. By application of the right-hand rule it can be readily established that in the various squares defined by the intersecting conductors of the windings $W_a$ and $W_b$, there will be one set of squares in which the fluxes produced by current flow in the bounding conductors will all be in the same direction and hence additive. In still another set of squares, the fluxes produced by current flow in the bounding conductors will also be additive but will be in the opposite direction to the first set. In still a third set, the fluxes produced by the bounding conductors will be in opposite directions and will tend to cancel each other. Assuming that the flux flow in the first set of squares mentioned is in a direction out of the plane of the drawings, such squares are labeled N. Then in the second set of squares, the flux flow will be into the plane of the drawings and such squares have been labeled S. The third set of squares wherein the flux flow is in opposition and substantially cancelled is designated by O.

Figure 4:
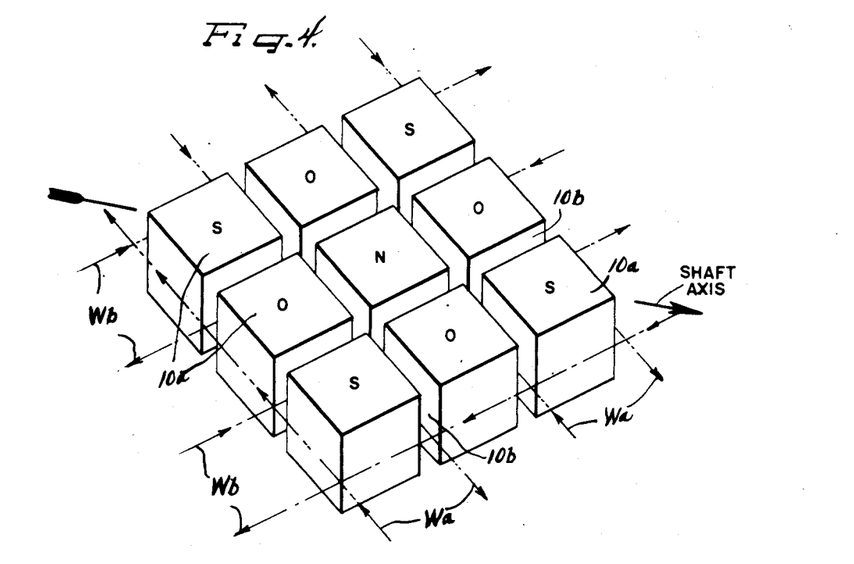
Figure 4 is a schematic perspective view illustrating the effective poles produced by the superposed coils or windings of the construction of Figure 1.

It is therefore apparent that the effect of substantially equal current flow in the two superposed windings $W_a$ and $W_b$ is to establish a waffle-like grid pattern of flux flow, wherein the adjacent squares to each O square in one diagonal direction are S squares, while the adjacent squares in the opposite diagonal direction of any particular O square are N squares. Now considering a practical construction, such as that of Figures 1 and 2 when the windings $W_a$ and $W_b$ are disposed in slots 10b in the pole face 10a of a magnetic structure 10, then the polarity of the squares of the pole face 10a will be as indicated in Figure 4. When such pole face is positioned adjacent a test piece such as shaft T, there are several possible paths of flux flow which could result from the waffle-like grid pole face arrangement established by the windings $W_a$ and $W_b$. Referring particularly to Figures 5a, 5b, 5c and 5d, Figure 5a represents probably the most predominant flux flow path wherein the flux leaves an N pole, crosses the minimum air gap portion to the shaft surface T, travels horizontally or circumferentially in the shaft surfaces, recrosses a minimum air gap, and enters an adjacent S pole.

Figure 5A:
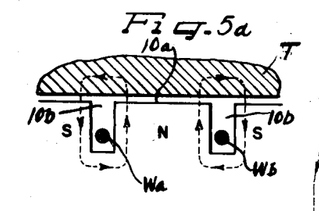
Figures 5a, 5b, 5c and 5d are respectively partial sectional views along planes Va, Vb, Vc and Vd of Figure 3 illustrating four possible flux flow conditions in the test piece and magnetic structure set up by flow of current in the two coils or windings of the construction of Figure 4.
Figure 5B:
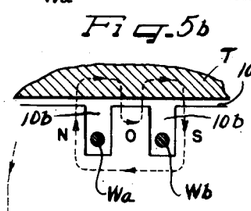

A second possible flux flow path is illustrated in Figure 5b. Here, the flux leave an N pole, crosses a minimum air gap to the shaft T, passes through the shaft surface at 45° or 135° to the shaft axis, recrosses a minimum air gap, and enters an O pole, again crosses the air gap, passes along the shaft surface and recrosses the air gap to enter an S pole.

Figure 5C:
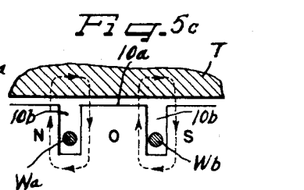

In the third possible flux flow path shown in Figure 5c, the flux leaves an N pole, crosses the minimum air gap to the surface of shaft T, passes through the shaft surface at 45° or 135° to the shaft axis, recrosses the minimum air gap, and enters an O pole face and returns to the initial N pole face through the core. In addition, flux leaves the opposite edge of the O pole face, crosses the air gap to the surface of shaft T, passes through the shaft surface at 135° or 45° to the shaft axis, recrosses the minimum air gap and enters the S pole to return to the O pole through the core.

Figures 5D, 6:
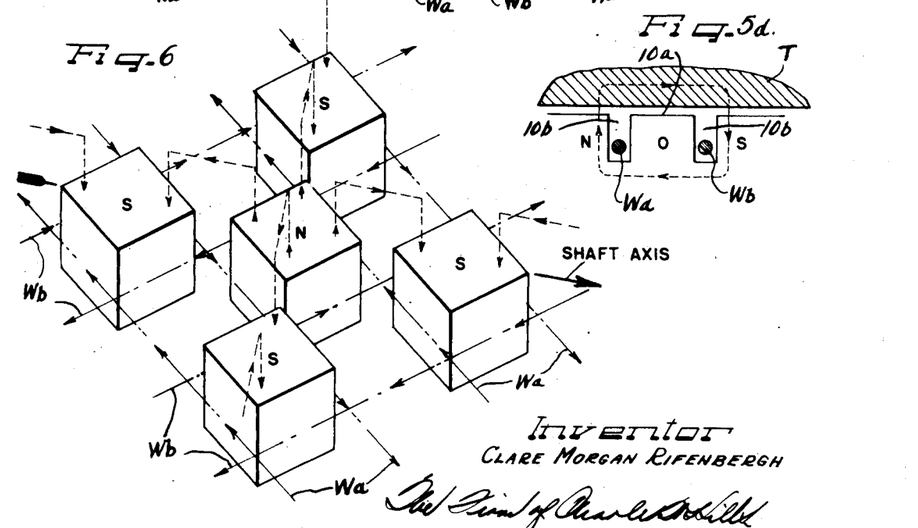
Figure 6 is a schematic perspective view illustrating the flux flow condition of Figure 5a, with other fluxes and poles omitted for the sake of clarity.

Lastly, in Figure 5d the possible flux flow path is from an N pole face, across the minimum air gap to the shaft X, then through the surface of shaft T at 45° or 135° of the shaft axis to a point opposite a further removed S pole and return to the original N pole through the core portion of the stack of laminations.

Of the four possible flux paths described above and illustrated in Figures 5a, 5b, 5c and 5d, the flux path represented by Figures 5a, 5b, and 5d are ineffective in producing a differential impedance effect on the pickup coils upon the application of a torsional stress to the shaft T. In the case of the path represented by Figure 5a, this lack of differential action may be clearly understood by reference to Figure 6 which shows such flux flow path in perspective and with the inactive poles and other flux paths omitted for purposes of clarity. It can be readily seen that most of the flux will tend to cross from the corner of an N pole to the adjacent corner of an S pole, passing through the adjacent portion of the surface of the shaft T. Although the flux in the shaft T may experience a change in magnitude or direction due to changes in reluctance or resistance produced by torque applied to the shaft, such flux links both the windings $W_a$ and $W_b$ and hence any change in the flux so produced effects both coils identically. Therefore, no detectable differential impedance change occurs by variations of the flux flow along the path represented by Figure 5a.

The flux flow paths represented by Figures 5b and 5d are of much less importance in that relatively small amount of flux flows along such paths due to the increased reluctance of these paths. However, it may be readily observed that the flux in these paths also links both coils and is thus ineffective to produce a detectable differential impedance change in the windings $W_a$ and $W_b$.

Figure 7:
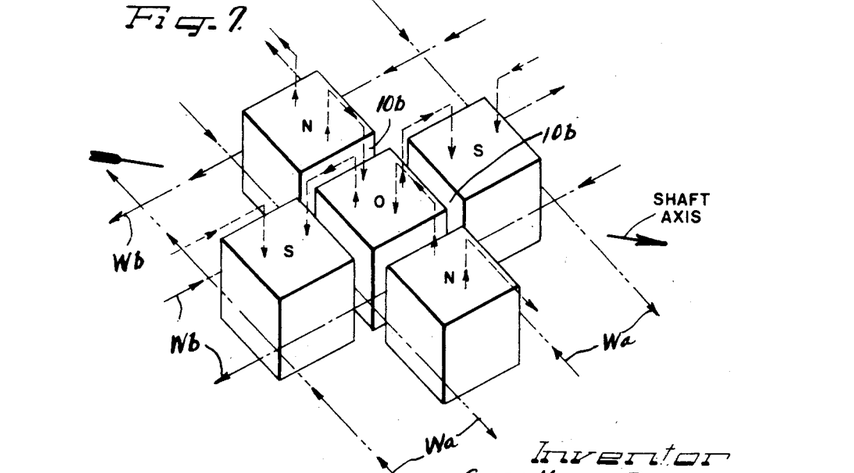
Figure 7 is a schematic perspective view illustrating the flux flow condition of Figure 5c, with other poles and flux paths omitted for the sake of clarity.

However, the flux which follows the path illustrated in Figure 5c is effective in bringing about a differential change in the impedances of the two pick-up coils when a torsional stress is applied to the shaft T. As more clearly shown in the perspective view of Figure 7, this portion of the flux passes through the shaft surface parallel to the maximum compressive or tensile stress components of applied torque. These two flux components are therefore oriented at 45° and 135° to the shaft axis respectively and link only one of the windings $W_a$ or $W_b$ apiece. If the reluctance or the eddy current resistance of the flux path through the shaft surface parallel to the tensile directional component of torsional stress increases, the flux aligned in this direction will decrease and hence the impedance of the particular winding $W_a$ or $W_b$ linked by this flux will decrease. The opposite effect will occur in the other winding whose flux is oriented at 90° to the first flux path just discussed. Thus, differential impedance changes will occur in each winding $W_a$ and $W_b$. Note that the occurrence of such differential impedance change is independent of the extent of surface of the test pieces over which the windings $W_a$ and $W_b$ are applied. In the case of a shaft it is unnecessary that the windings completely lap the shaft periphery.

Figure 14:
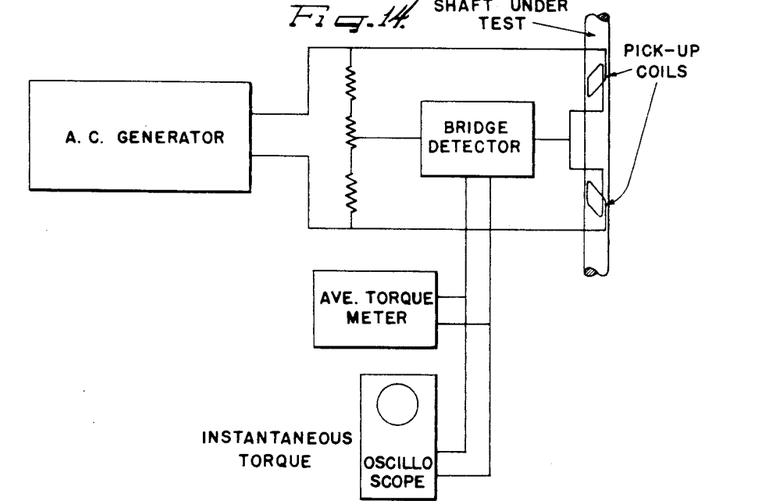
Figure 14 is a schematic circuit diagram illustrating the connection of the pickup coils with the electrical measuring circuit for a torquemeter.

When the two windings $W_a$ and $W_b$ are incorporated in a suitable bridge circuit, such as in the manner illustrated in Figure 14 to be described later, a signal will appear across the output terminals of the bridge detector. If the reluctance and resistance changes in the shaft surface are proportional to the applied torque, the resulting signal will indicate a similar relationship to torque.

It is therefore demonstrated that superposed coils may be utilized to produce an accurate indication of torque variation in a member disposed adjacent such coils. Whether or not the above explanation is in whole or in part correct, the differential impedance effect has been experimentally determined to be present. Similar arrangements may be readily used to achieve the measurements of tensile and compressive directional components of stress in a member of any desired shape and which is subjected to any type of stress or strain. Though the coils are superimposed, so long as a portion of the fluxes produced by the coils are respectively preferentially oriented with respect to the tensile or compressive directional components of stress in the member to be tested, a differential impedance variation will be produced upon the two coils and such differential impedance effect may be readily detected and measured by any conventional bridge circuit to provide an accurate indication of the stress existent in the member under test. It should also be particularly noted that the operation of the superimposed coil construction is in no manner subject to frequency limitations. Of course, for frequencies above the audio range it would probably be desirable to eliminate any magnetic structure because of the very great losses inherent therein. However, the fundamental flux relationship with respect to the coils and the member being tested will be unchanged.

A further feature of this invention is the discovery that when alternating, periodic, or intermittent currents are employed having a frequency lying in the audio range so as to permit the efficient utilization of a magnetic structure in conneciton with the flux-responsive coils, then it is not necessary that such coils be oriented with respect to the stress components in the member being tested, so long as the pole face of the magnetic structure is suitably contoured to provide a low permeability gap or gaps which are oriented with respect to either the tensile or compressive directional components of the stress applied to the member. In the following discussion, such oriented low permeability gaps will, for simplicity, be referred to as air gaps but it should be understood that the oriented gap may be equally well defined by any non-magnetic or low permeability material in addition to, or in place of, air.

Figure 8:
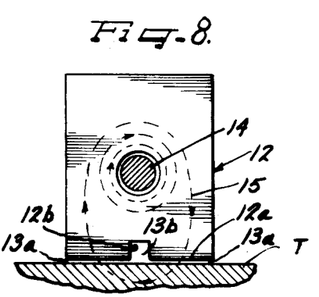
Figure 8 is a diagrammatic elevational view illustrating the flux paths produced by a conductor passing through an elemental magnetic lamination having a grooved or slotted pole face adjacent a member to be tested.

Referring to Figure 8, there is shown schematically a portion of the surface of a member T which is to be stress analyzed. An elemental magnetic structure 12, which may comprise a single lamination, is disposed adjacent the surface of the member T. The pole face portion 12a of the elemental magnetic member 12 is provided with a groove, recess, depression or slot 12b so as to define a non-uniform air gap between the magnetic member and the surface of the member T. Such non-uniform air gap has a pair of minimum width portions 13a respectively disposed on opposite sides of a large width portion 13b. Now if a current carrying conductor 14 is located so as to pass generally transversely through the elemental magnetic member 12, then the magnetic flux produced by the current carrying conductor 14 will produce a pattern indicated diagrammatically by the dotted line 15. It is to be noted that irrespective of the actual position of the current carrying conductor 14 with respect to the surface of the member T being tested, a certain portion of the flux produced by the current carrying conductor 14 will cross the one minimum air gap portion 13a, then pass through that portion of the surface of member T which is disposed opposite the wide air gap portion 13b and then recross the other minimum air gap portion 13a and complete its circuit through the magnetic element 12.

Figure 9:
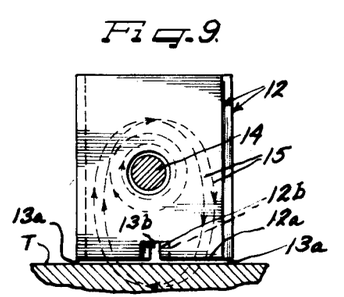
Figure 9 is a view similar to Figure 8 but illustrating the flux paths produced by assembling a stack of similar elemental laminations and orienting the depressions or slots in the pole faces of the stack with respect to the surface of the member to be tested.

Referring now to Figure 9, let it be assumed that a plurality of magnetic elements 12, which may or may not be identical, are arranged in a stacked relationship adjacent the surface of the member T to be tested. Each of such magnetic elements has a non-uniform pole face 12a contoured to provide a groove, recess, depression or slot portion 12b. The relative position of successive magnetic elements 12 in the stack is selected so that the wide air gap portion 13b defined by the slots 12b are disposed in a predetermined alignment with respect to the tensile or compressive directional components of the stress in the member T being tested. Such alignment is preferably accomplished so that the length axis of the resulting aligned slot or groove is disposed in generally perpendicular relationship with respect to either the tensile or compressive directional components of stress applied to the member T. In the particular example of an apparatus for measuring torque in a shaft, the slots 12b are aligned so as to lie along a helix having a pitch angle of either 45° or 135° with respect to the axis of the shaft T under test. Hence, as best shown in Figure 10, the developed path of the resulting aligned slot lies along a line disposed at an angle $a$ of substantially 45° with respect to the axis $S_a$ of the shaft under test.

Now if the current carrying conductor 14 is extended to pass through each magnetic element 12 of the aligned stack, it will be seen that at least a portion of the resulting flux flow, indicated by the dotted lines 15, will pass through the surface of the member T in a direction generally perpendicular to the longitudinal axis of the aligned slots 12b or the wide air gap portions 13b defined by the stack of laminations. Hence a flux flow is produced which is oriented with respect to either the tensile or compressive directional component of stress applied to the member T. It should be particularly noted that such oriented flux flow results substantially independently of the position of the current carrying conductor 14 with respect to the member T. Therefore this invention provides a stress measuring method and apparatus wherein a stress oriented flux flow in a member under test may be produced by non-oriented coils or windings cooperating with a magnetic structure having a pole face defining a stress oriented, non-uniform air gap between the magnetic structure and the member under test. Furthermore, if a laminated magnetic structure is employed, it is unnecessary that any one of the individual laminations be oriented with respect to the stress component in the member being tested so long as each lamination provide an air gap and an element of flux flowing around such air gap, which flux element in itself may not necessarily be oriented with respect to either the tensile or compressive directional component of stress in the member being tested, but, when properly coordinated with similar flux elements produced by other laminations of a group or stack, provides a desired aggregate flux which is preferentially oriented with respect to either the tensile or compressive directional component of stress.

Figure 10:
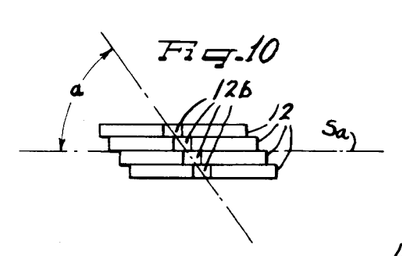
Figure 10 is an elevational view of the pole face configuration of Figure 9.
Figure 11:
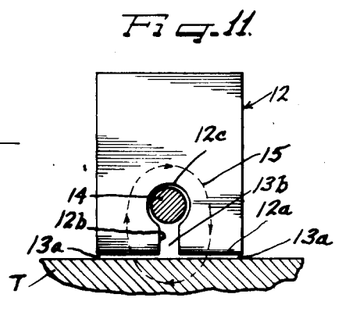
Figure 11 is a view similar to Figure 8 but representing a modified construction wherein the flux-producing coil or winding is disposed in the grooved or slot portion of the non-uniform pole face of the lamination.

It so happens that even though it is not necessary to orient the windings or coils with respect to the stress oriented flux, as a matter of manufacturing convenience, and to increase the magnitude of the stress responsive flux, over that which would be obtained in the structures of Figures 8, 9 and 10, used primarily for explanatory purposes, such windings or coils may be most conveniently inserted and mounted in the grooves, recesses or slots formed in the pole face of the magnetic structure to define the stress oriented air gap therein. Therefore, as diagrammatically indicated in Figure 11, the current carrying conductor 14 may be conveniently disposed in an enlarged portion 12c of the groove or slot 12b defined by the pole face of the magnetic element 12.

Referring back to Figures 1 and 2, it will be seen that in the superimposed coil torquemeter construction represented by such figures, advantage has been taken of this feature in that the two sets of coils or windings $W_a$ and $W_b$ are respectively disposed in the two sets of mutually perpendicular, helically extending slots 10b formed in the pole face 10a of an annular magnetic structure which defines two sets of air gap contours respectively oriented with the tensile and compressive directional components of resolved torsional stress in the shaft T under test.

Figure 12:
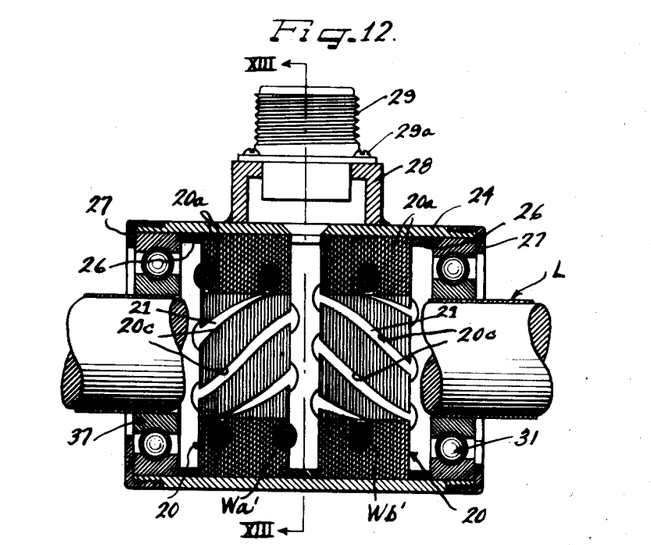
Figure 12 is a sectional view, taken on a plane parallel to the axis, of an assembled torquemeter unit employing axially spaced magnetic stator elements having helically slotted pole faces produced by skewing of the identical laminations with respect to each other.
Figure 13:
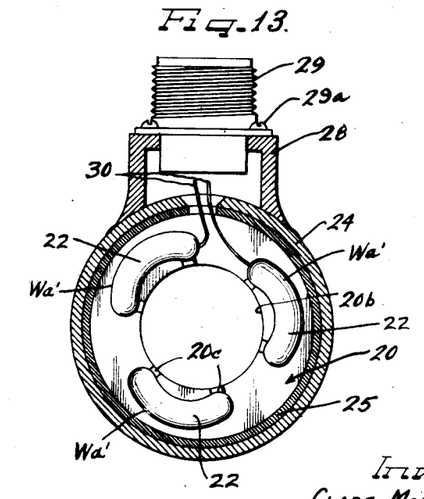
Figure 13 is a sectional view taken on the plane XIII—XIII of Figure 12.

Referring now to Figures 12 and 13, there is shown another specific embodiment of this invention in the form of an apparatus for measuring or indicating torque in a stationary or rotating shaft. In contrast to the construction of Figures 1 and 2, the modification of Figures 12 and 13 utilize a pair of windings $W_{a'}$ and $W_{b'}$, which are not axially superimposed but are axially spaced. Where adequate space along the shaft to be tested is available, this latter construction may be preferred over that of Figures 1 and 2 inasmuch as the magnetic structures 20 respectively associated with the windings $W_{a'}$ and $W_{b'}$ may be more economically assembled and, in fact, do not require any complicated machining operations thereon to produce the stress oriented air gap configuration of the pole face portion thereof. Each of the magnetic structures 20 is substantially identical, except as hereafter specified, and comprises a stack of annular laminations 20a having an inner cylindrical pole face 20b which is suitably dimentioned to lie closely adjacent the periphery of the shaft T. Each individual lamination 20a has circumferentially spaced, generally radially extending slots 20c formed in its pole face 20b. Preferably, each of the laminations 20a are identical and may be economically fabricated by conventional stamping operations. A group of laminations 20a are then assembled into stacks corresponding to the desired axial thickness of the magnetic structure 20 and, when so assembled, the individual laminations 20a are circumferentially displaced or skewed relative to each other so that the slot portions 20c thereof are aligned in a generally helical contour. The one magnetic structure 20 is skewed to provide a helical slot pitch angle of substantially 45° with respect to the shaft axis while the other magnetic structure 20 is skewed to provide a helical slot pitch angle of substantially 135°. Hence the resulting helical slots in the two magnetic structures are substantially perpendicularly disposed relative to each other.

The windings $W_{a'}$ and $W_{b'}$ are then respectively applied in conventional manner to the magnetic structures 20. Each coil of the winding has two active side portions 21 disposed in the helical slots of the skewed lamaniations and two inactive sides 22 disposed in planes substantially perpendicular to the axis of the shaft T.

To support the wound magnetic structures 20 with reference to shaft T, a hollow cylindrical housing 24 is provided which is open at both ends and suitably dimensioned to permit the magnetic structures 20 to be snugly inserted therein. Axial separation of the magnetic structures 20 is obtained by a spacer ring 25 disposed therebetween. Additional spacer rings 26 are provided against each of the outer faces of the magnetic structures 20 and respectively define seating shoulders for a pair of anti-friction bearing elements 31. Bearing elements 31 are respectively secured in assembly to the housing 24 by end caps 27 which are threadably secured to the ends of the housing 24. The central portion of housing 24 has a hollow conduit chamber member 28 suitably secured thereto as by welding. A tubular fitting 29 is secured to conduit chamber 28 as by screws 29a and defines a hollow passage for the necessary electrical connections 30 for the windings $W_{a'}$ and $W_{b'}$.

The anti-friction bearings 31 are provided for the obvious purpose of accurately locating the pole faces of the magnetic structures 20 with respect to the surface of the shaft T. Furthermore, such bearings insure that no rubbing contact of the pole face portions of the magnetic structure with the shaft T will occur, which would obviously produce inaccuracies in the stress-responsive characteristics of the windings $W_{a'}$ and $W_{b'}$.

If the shaft T is formed of material which does not have suitable magnetostrictive or elasto-resistive properties for linearly and differentially affecting the impedances of the windings $W_{a'}$ and $W_{b'}$, then, as described and claimed in my above referred to co-pending application, a thin layer, shell or sheath L of material having suitable magnetostrictive and/or elasto-resistive properties may be applied to the shaft T and rigidly secured thereto so as to be subject to the same stresses as are applied to the shaft T.

As has been heretofore mentioned and as more thoroughly discussed in my co-pending application, the two windings of stress measuring apparatus embodying this invention are electrically connected to a suitable detector circuit to provide a measurement or indication of the differential impedance effects produced on such windings by the application of stress to the member being tested. It is of course immaterial to the construction and operation of the detecting circuit whether the stress-responsive pick up coils are superimposed or separated. In either event, as shown in Figure 14, the pickup coils are connected in adjacent arms of a bridge detector circuit which is supplied by a suitable alternating current generator. The bridge circuit is initially balanced for zero torque or a known torque condition and thereafter application of stress to the member under test will produce a signal voltage across the output terminals of the bridge detector. Such signal voltage may be applied to a conventional meter to indicate the average torque conditions in the shaft under test, or applied to any desired form of transient indicating and/or recording instrument, such as an oscilloscope, for indicating the instantaneous values of stress in the member.

Figure 15:
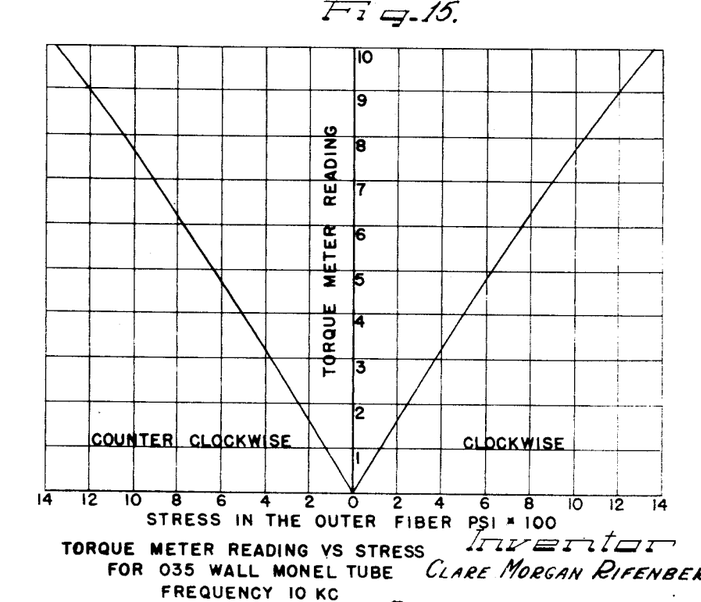
Figure 15 is a graph showing a typical calibration curve obtained in a torquemeter embodying this invention.

In the case of a torquemeter, the apparatus may be readily calibrated by applying known torques to the shaft under test while held stationary and recording the indications of the average torque indicating meter. A calibration chart similar to that shown in Figure 15 may thus be obtained.

It is desired to specifically point out that the superimposed coil construction disclosed by this invention provides substantial electrical improvements in addition to its space conserving feature. In particular, the superimposed coil construction substantially eliminates the effects of temperature gradients along the length of the member being tested. Such temperature gradients would, of course, unequally affect the pick coils of apparatus employing spaced pick-up coils. Furthermore, since both coils of a superimposed coil arrangement are operating on substantially the same portion of the shaft or member under test, variations in material and crystal structure, or fabrication defects such as scratches and small cracks, or similar irregularities will not produce differential effects upon the two pickup coils. Hence when identical pickup coils are utilized, the cooperating bridge circuit may not only be readily balanced but the resulting indications will be substantially free of extraneous influences.

It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. Apparatus for determining torsional stress in a shaft comprising a magnetic structure having a face disposed adjacent a stressed portion of said shaft, said face being contoured to provide a plurality of axially separated minimum air gaps with respect to said shaft of generally helical configuration, and a coil cooperating with said magnetic structure to produce a flux traversing that portion of said shaft lying axially intermediate said minimum air gaps.

2. Apparatus for determining torsional stress in a shaft comprising a magnetic structure having a face disposed adjacent a stressed portion of said shaft, said face being contoured to provide two sets of minimum air gaps with respect to said shaft, the minimum air gap of each set being of generally helical configuration and one set being axially spaced from the other, the gaps of said sets extending in mutually perpendicular directions, and a pair of coils cooperating with said magnetic structure to produce fluxes respectively traversing said minimum air gap sets.

3. Apparatus for determining torsional stress in a shaft comprising a magnetic structure having a pair of axially spaced faces respectively disposed adjacent axially spaced stressed portions of said shaft, each face being contoured to provide a set of axially spaced minimum air gaps with respect to said shaft of generally helical configuration, the helical pitch angle of one set of said minimum air gaps being substantially 90° displaced from the other set, and a pair of coils cooperating with said magnetic structure to produce fluxes respectively traversing said minimum air gap sets.

4. Apparatus for determining torsional stress in a shaft comprising a pair of annular axially spaced, magnetic structures surrounding a stressed portion of said shaft, each of said structures having an inner face disposed adjacent said shaft portion but radially spaced therefrom, each of said inner faces being radially contoured to provide a set of axially spaced, minimum air gap regions extending helically with respect to said shaft portion, the helical pitch angles of one set of said minimum air gap regions being substantially 90° displaced from the other set, and a pair of windings respectively associated with said magnetic structures and arranged to produce magnetic fluxes respectively traversing said minimum air gap sets.

5. Apparatus for determining torsional stress in a shaft comprising a pair of annular, axially spaced, magnetic structures surrounding a stressed portion of said shaft, each of said structures having an inner face disposed adjacent said shaft portion but radially spaced therefrom, each of said inner faces having a helically extending slot therein, the helical slot in one magnetic structure being substantially perpendicular to the slot in said other magnetic structure, and a pair of windings respectively associated with said magnetic structures and arranged to produce magnetic fluxes respectively traversing said minimum air gaps.

6. The combination defined in claim 5 wherein said windings are respectively disposed in the helical slots of the magnetic structure.

7. Apparatus for determining torsional stresses in a shaft comprising magnetic structure surrounding a stressed portion of the shaft, said magnetic structure having a pole face disposed adjacent to but radially spaced from said shaft portion, said pole face having a helically extending slot therein, thereby defining a pair of axially spaced, minimum air gap regions with respect to said shaft of generally helical configuration, and a winding associated with said magnetic structure and arranged to produce a magnetic flux traversing said minimum air gap regions and that portion of said shaft lying between said minimum air gap regions.

8. Apparatus for determining torsional stress in a shaft comprising an annular magnetic structure surrounding a stressed portion of the shaft, said magnetic structure having a pole face disposed adjacent to but radially spaced from said shaft portion, said pole face having two sets of helically extending slots therein, said sets being mutually perpendicular, thereby defining two sets of minimum air gap regions of generally helical configuration, and a pair of windings associated with said magnetic structure and arranged to produce magnetic fluxes respectively traversing said sets of minimum air gap regions.

9. The combination defined in claim 8 wherein said windings are respectively disposed in the helical slots of the magnetic structures.

10. Apparatus for determining stress in a member subjected simultaneously to angularly divergent tensile and compressive stresses comprising a stack of magnetic laminations disposed with one face of the stack adjacent the surface of the member, said face having two sets of coil slots therein, said sets of coil slots being respectively substantially parallel to said angularly divergent tensile and compressive stresses in said member, and a pair of conducting coils respectively inserted in said sets of slots.

11. Apparatus for determining stress in a member subjected simultaneously to angularly divergent tensile and compressive stresses comprising a stack of magnetic laminations disposed with one end face of the stack adjacent the surface of the member, said end face having two sets of coil slots therein, said sets of slots being mutually perpendicular and intersecting the plane of the laminations at substantially 45°, said sets being respectively substantially parallel to said angularly divergent tensile and compressive stresses in said member, and a pair of conducting coils respectively inserted in said sets of slots.

12. Apparatus for determining torsional stresses in a shaft-like member comprising a stack of magnetic laminations disposed in partial surrounding relationship with said shaft-like member, the inner end face of said stack having two sets of coil slots therein, said sets being mutually perpendicular and extending helically with respect to the axis of said shaft-like member, and a pair of conducting coils respectively inserted in said sets of slots.

13. Apparatus for determining torsional stresses in a shaft-like member comprising a pair of electrically conducting coils, means for supporting said coils adjacent the shaft periphery in axially superposed relation, each of said coils having one side thereof extending in generally helical relation with respect to said shaft, said helical coil sides being mutually angularly divergent, whereby the effective impedances of said coils are oppositely varied by application of stress to said shaft.

14. Apparatus for measuring torsional stresses in a circular cross section shaft comprising a pair of substantially identical, electrically conducting coils, means for supporting said coils adjacent the shaft periphery in axially superposed relation, each of said coils having two sides thereof extending in a generally helical configuration of substantially 45° pitch angle with respect to said shaft, said helically extending sides of one coil being substantially perpendicular to the helically extending sides of the other coil, and the remaining sides of said coils lying substantially parallel to a plane perpendicular to the axis of said shaft.

15. Apparatus for measuring torsional stresses in a circular cross section shaft comprising a pair of substantially identical, electrically conducting coils, magnetic means for supporting said coils adjacent the shaft periphery in axially superposed relation, each of said coils having two sides thereof extending in a generally helical configuration with respect to said shaft, said helically extending sides of one coil being substantially perpendicular to the helically extending sides of the other coil.

16. Apparatus for determining stress in a member comprising a magnetic structure having a face disposed adjacent said member, said face being contoured to provide linearly extending minimum air gaps with respect to said member disposed in parallel and perpendicular sets, and a current coil associated with each set and cooperating with said magnetic structure to produce fluxes in said member which are mutually perpendicular.

17. The combination defined in claim 26 wherein said magnetic structure comprises a stack of identical laminations, each lamination having a slot in its said adjacent face, and each of said laminations being displaced relative to the others whereby said slots are preferentially oriented with respect to the direction of stress in the member.

18. The combination defined in claim 1 wherein said magnetic structure comprises a stack of identical laminations, each lamination having a slot in its said adjacent face, and each of said laminations being skewed relative to the others to place said slots in generally helical alignment, thereby defining said axially separated minimum air gaps.

19. The combination defined in claim 4 wherein each of said magnetic structures comprises a stack of identical laminations, each of said laminations having circumferentially spaced slots in its inner face, the laminations of each stack being skewed relative to each other to align said slots in a generally helical array, thereby defining said sets of minimum air gap regions.

20. Apparatus for determining stress in a member subjected to perpendicularly oriented tensile and compressive stresses comprising a magnetic structure having a face disposed adjacent a stressed portion of said member, said face being contoured to provide a plurality of linearly extending minimum air gaps with respect to said member disposed in parallel and perpendicular sets, and a current coil associated with each set and cooperating with said magnetic structure to produce mutually perpendicular fluxes traversing those portions of said member disposed between adjacent minimum air gaps.

CLARE MORGAN RIFENBERGH.

REFERENCES CITED

The following references are of record in the file of this patent:

UNITED STATES PATENTS

| Number | Name | Date |
| --- | --- | --- |
| 2,053,560 | Janovsky | Sept. 8, 1936 |
| 2,337,231 | Cloud | Dec. 21, 1943 |
| 2,365,073 | Haight | Dec. 12, 1944 |
| 2,365,565 | Langer | Dec. 19, 1944 |

FOREIGN PATENTS

| Number | Country | Date |
| --- | --- | --- |
| 442,441 | Great Britain | Feb. 3, 1936 |
| 831,342 | France | June 7, 1938 |
| 49,262 | France | Nov. 12, 1938 |